Figure 1:
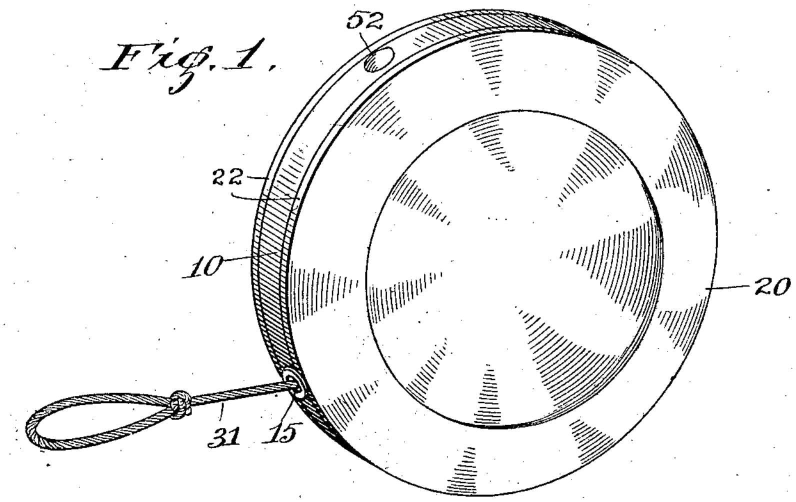

No. 845,401. PATENTED FEB. 26, 1907.

S. S. FIELD.

AUTOMATIC CHALKER AND REEL FOR CHALK LINES.

APPLICATION FILED JUNE 2, 1906.

2 SHEETS—SHEET 1.

Witnesses:
Wm P. Bond
A. E. Anderson

Inventor:
Sjonne S. Field.
by Charles O. Shervey
Atty

THE NORRIS PETERS CO., WASHINGTON, D. C.

No. 845,401. PATENTED FEB. 26, 1907.

S. S. FIELD.

AUTOMATIC CHALKER AND REEL FOR CHALK LINES.

APPLICATION FILED JUNE 2, 1906.

2 SHEETS—SHEET 2.

Witnesses:

Wm P. Bond

G. T. Anderson

Inventor:

Sjomme S. Field.

by Charles O. Shervey.

Atty.

THE NORRIS PETERS CO., WASHINGTON, D. C.

UNITED STATES PATENT OFFICE.

SJONNE S. FIELD, OF CHICAGO, ILLINOIS.

AUTOMATIC CHALKER AND REEL FOR CHALK-LINES.

No. 845,401. Specification of Letters Patent. Patented Feb. 26, 1907.

Application filed June 2, 1906. Serial No. 319,821.

*To all whom it may concern:*

Be it known that I, SJONNE S. FIELD, a resident of the city of Chicago, in the county of Cook and State of Illinois, have invented certain new and useful Improvements in Automatic Chalkers and Reels for Chalk-Lines, of which the following is a full, clear, and exact description.

My invention relates to certain new and useful improvements in chalk-lines, such as are used by painters, decorators, and others in laying out their work to make straight guide-lines.

The object of this invention is to produce a device for automatically winding up the line on a reel and chalking it as it passes to and from the reel, so that at all times it is properly chalked and ready for use, the time usually employed to chalk the line by hand being thus saved.

Another object of the invention is to provide means for wearing the chalk down evenly in order that economy in the use of the chalk may be had and the line itself chalked to the best advantage.

Another object is to produce a device which may be conveniently handled by the workman in laying out his work.

The device contains certain novel features of construction and arrangement, a description of which will be found in the following specification and the essential features definitely pointed out in the claims.

The invention is clearly illustrated in the drawings furnished herewith, in which—

Figure 2:
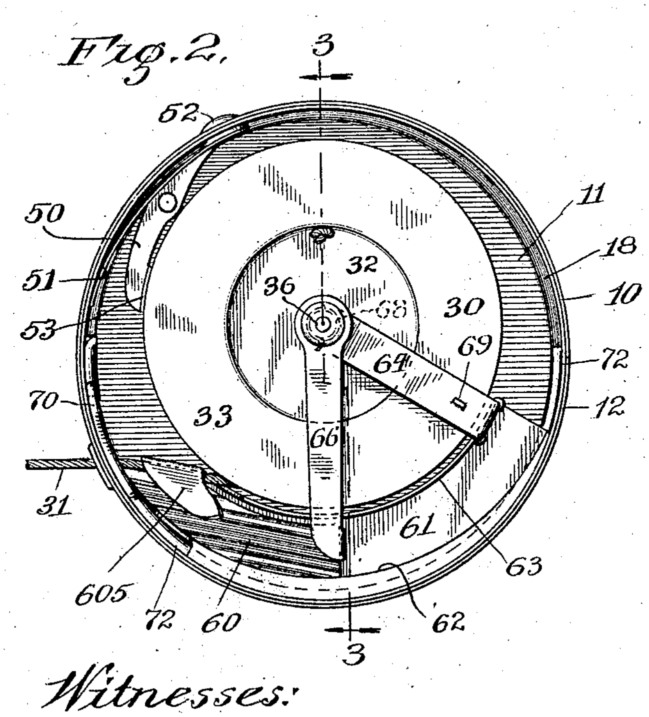
Figure 3:
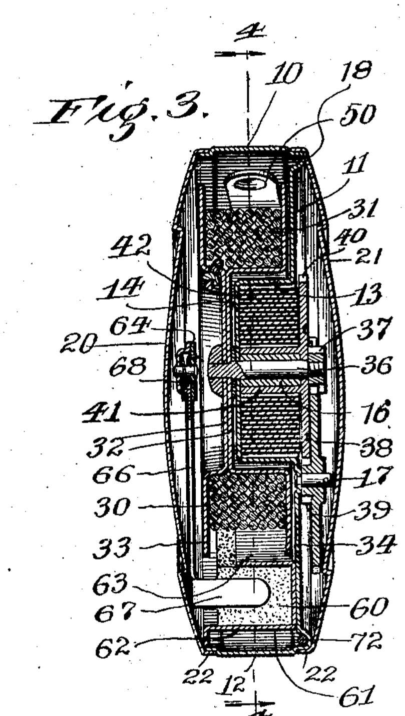
Figure 4:
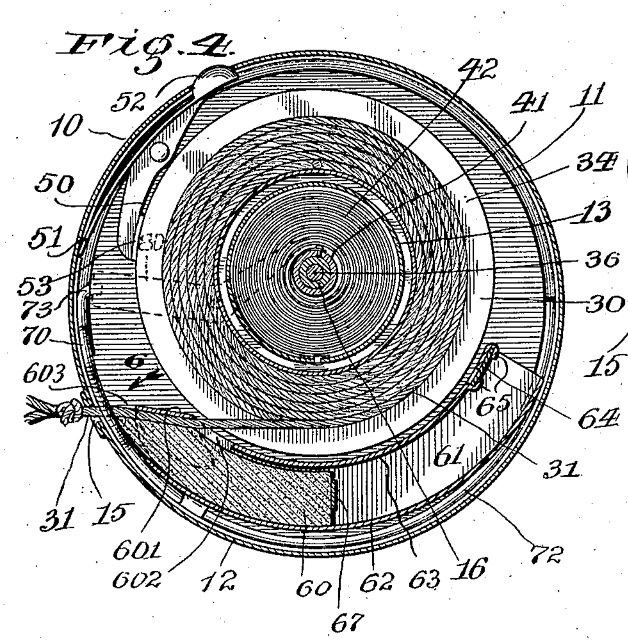
Figure 6:
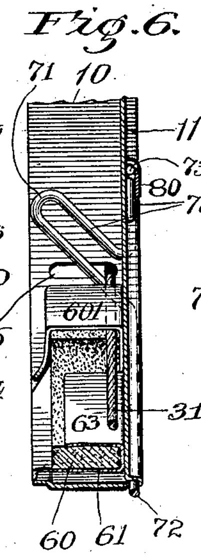
Figure 7:
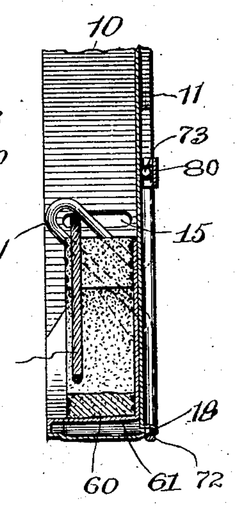
Figure 5:
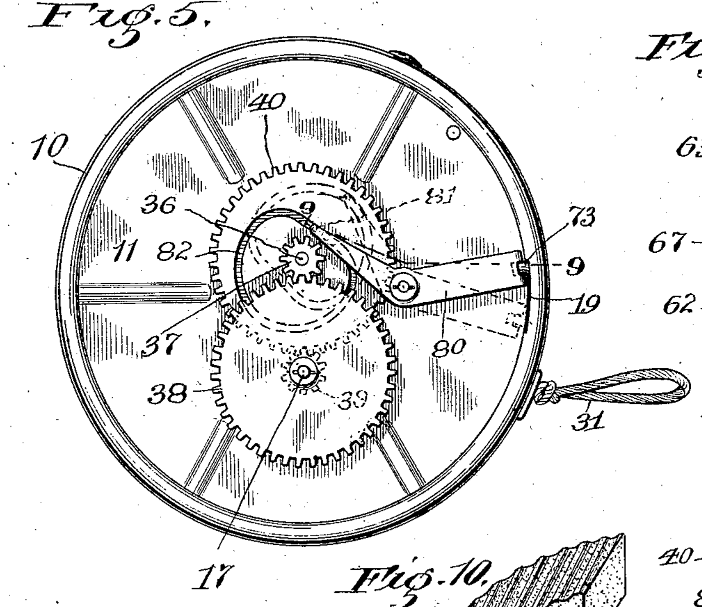
Figures 8, 9:
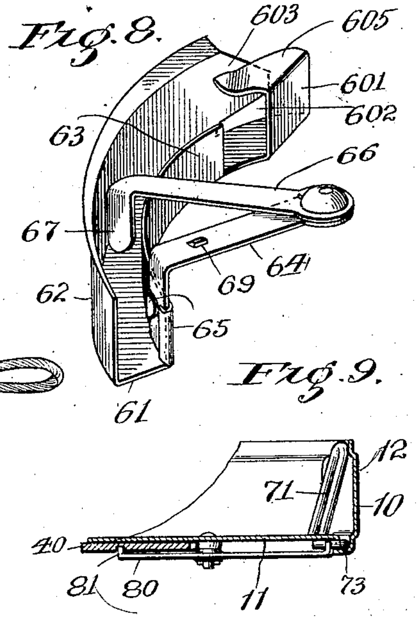
Figure 10:
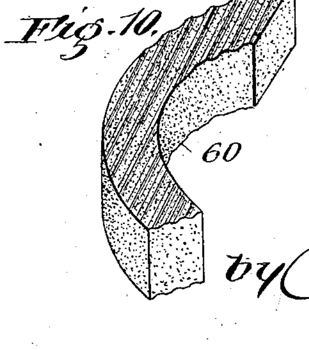

Figure 1 is a perspective view of the device in its preferred form. Fig. 2 is a side view with one of the covers removed to show the construction and arrangement of parts within the case. Fig. 3 is a diametrical section in the line 3 3, Fig. 2. Fig. 4 is a section in the line 4 4, Fig. 3. Fig. 5 is a side view of the device looking in a direction opposite to that in which Fig. 2 is seen. Fig. 6 is a detail face view of the line-shifter looking in the direction of the arrow 6 in Fig. 4, showing the casing in section and both covers removed. Fig. 7 is a similar view showing the shifter in a different position. Fig. 8 is a perspective view of the chalk-magazine. Fig. 9 is a detail view of the lever which actuates the line-shifter, the casing being shown in section and the line of section indicated at 9 9, Fig. 5; and Fig. 10 is a perspective view of a piece of the chalk.

In these views, 10 represents the shell or casing, which in its preferred form consists in a wall 11 and an annular flange 12 of such width as will conveniently hold a suitable reel for the cord or line. The two sides of the device are in the form of removable covers 20 21, which are concavo-convex in form and inclose the operating parts of the device. The covers have annular flanges 22, which fit over the edges of the main casing 10 and hold the covers on by friction. The wall 11 of the casing is flanged inward, as seen at 13, Figs. 3 and 4, to provide a housing for the spring hereafter described, and said flange terminates in a partition 14, which lies parallel with the wall 11.

A reel 30 is journaled in the casing and carries the cord or line 31, which is secured to it and extends out through an opening 15 in the end wall 12, beyond which it is formed with a knot to guard against its being accidentally drawn into the casing. The reel 30 is preferably formed in two parts, which contain flat portions 32, that are placed back to back and form the web of the reel. Flanges 33 34 extend out from the face of the reel, making a groove for containing the cord. A journal-pin 36 is rigidly secured to the web of the reel and extends out through the partition 14 and through a sleeve 16, which projects out from the partition, and said pin 36 carries upon its outer end a pinion 37, that meshes with a gear-wheel 38, journaled upon a stud 17, secured to the wall 11. The gear 38 bears a pinion 39, which meshes with a gear 40, which is journaled concentric with the pin 36 and rotates relatively therewith. The gear 40 bears a hub 41, which encircles the sleeve 16, and a clock-spring 42 connects the hub 41 and flange 13 or the casing, the spring being wound to rotate the reel in the proper direction to rewind the cord whenever a portion of it is withdrawn.

Rotation of the reel 30, caused by the unwinding of the cord, causes the pinion 37 to rotate therewith, and inasmuch as the pinion 37 meshes with the gear 38 this rotary movement is imparted thereto, the pinion 39 turning with the gear 38 and transferring said rotary movement to the gear 40. The spring 42, being fast to the hub 41 of the gear 40, is thus wound up and if the cord be released will rewind the same upon the reel.

It will be perfectly evident from the above description that the cord may be drawn out through the opening 15 in the casing and when released will be drawn back into the casing and wound up on the reel by the action of the spring. It is, however, desirable that the line may be drawn out to a certain length and there remain unaffected by the spring, so that it will not be wound up except at will. For this purpose I have provided a brake which normally prevents the rotation of the reel, but which can be operated by pressure of the thumb to release the reel, thereby allowing the spring to act and wind up the cord. This brake is shown as consisting of a lever 50, pivoted to the wall 11 of the casing and provided with a spring 51, which bears against the casing to hold the shoe 53 in frictional engagement with the periphery of the flange 34 of the reel. A knob 52 upon one end of the brake-lever projects out through an opening in the casing and furnishes means whereby the lever can be operated from without. Whenever the cord is drawn out and released, the brake acts to prevent the rewinding of the cord; but by depressing the knob the brake is released, permitting the spring to rotate the reel and wind up the cord.

The ordinary chalk-line is chalked by rubbing it with a piece of chalk, and much of the chalk is necessarily rubbed off in the handling of the line, besides the task takes considerable time and labor. In my device I have interposed a piece of chalk in the path of the cord, over which the same passes, both in being drawn out of the device and in being rewound upon the reel. Chalk is thus applied twice during the withdrawal and return of the cord, thereby insuring the perfect chalking thereof. The chalk is shown at 60 and is confined in a magazine 61, which is secured to the casing. The magazine contains two arc-shaped walls 62 63, which are concentric with the reel and guide the chalk toward the line, the chalk being segmental in form and practically fitting between the walls 62 63. An arm 64 is secured to the wall 63 by two overhanging hooks 65, stamped up from the wall 63, and upon the end of said arm is pivoted a swinging arm 66, which has a downwardly-projecting end 67, that engages with the end of the chalk. A coiled spring 68 is interposed between the arms 64 66 and acts to feed the chalk on toward the line. A stop 69 is formed upon the arm 64, behind which the swinging arm 66 may be forced when reloading the magazine. A wall 601 is placed across one end of the magazine, and this end wall extends at a suitable angle to direct the cord into the groove of the reel. The end wall 601 has a flange 605, which projects over the chalk and confines it in the proper position to be acted upon by the line passing over it. Openings 602 603 are formed in the walls adjacent to the end wall 601, through which the cord passes on its way to and from the reel, the chalk being held in contact with the cord by the spring-pressed arm 66. To prevent the wearing of a single groove in the chalk by the cord, a cord-shifter 70 is provided, which contains a guiding-loop 71, lying just behind the opening 15 in the casing. The loop 71 extends at an angle to the opening and when moved up or down, as viewed in Figs. 6 and 7, shifts the cord sidewise, thereby causing it to wear the surface of the chalk down evenly. The shifter has a long curved base 72, which is seated in an annular groove 18, formed in the angle between the flange 12 and wall 11 of the casing, and the bottom of the chalk-magazine extends over the groove and keeps the base 72 of the shifter in its seat. The shifter receives its motion from a lever 80, which is pivoted to the wall 11 of the casing and engages an end 73 of the shifter which projects through an opening 19 in the casing. The other end of the lever 80 has a pin 81, which runs in a cam-groove 82, formed in the face of the gear 40 and so shaped as to oscillate the lever 80. It will be evident that such movement of the lever 80 will necessarily move the shifter 70 up and down, as viewed in Figs. 6 and 7, consequently shifting the cord across the face of the chalk. The chalk is preferably formed with grooves in two of its sides, as shown in Fig. 10, the object of which is to prevent the formation of fins at the two side edges of the chalk, which might otherwise be caused by the action of the cord thereupon. The cord being round, would naturally leave a slight fin on either edge of the chalk unless it passed clear across it; but as its movement is bounded by the magazine it cannot do so. The formation of the grooves causes the fins to break off, thereby allowing the chalk to be held in contact with the cord at all times.

In the operation of the device the cord may be drawn out, and as it passes through the chalk-magazine is chalked and ready for use. As it is drawn out the reel is rotated and the spring wound up through the medium of the gearing. The cord may now be released and will not be affected by the reeling mechanism. Pressure upon the knob 52 will, however, release the reel, allowing the spring to rewind the cord.

I realize that various alterations and modifications of the device are possible, and I do not, therefore, desire to limit myself to the exact construction shown and described.

I claim as new and desire to secure by Letters Patent—

1. In a device of the class described, the combination of a chalk-line, reeling mechanism, an arc-shaped chalk-magazine, a chalk-stick, a spring-pressed follower pivoted concentric with the arc-shaped magazine and adapted to feed the chalk onward to the line.

2. In a device of the class described, the combination of a chalk-line, reeling mechanism, a chalk-magazine, a chalk-stick in said magazine, a supporting-arm removably mounted upon the magazine and a spring-pressed chalk-follower pivoted upon said arm.

3. In a device of the class described, the combination of an arc-shaped chalk-magazine, a radially-extending supporting-arm, a spring-pressed follower-arm pivoted upon the supporting-arm concentrically with the magazine and a holdback-catch upon the supporting-arm for the follower-arm.

4. In a device of the class described, the combination of a chalk-line, a reel, a chalk-stick, and chalk-line-shifting mechanism operating to move the line transversely across the face of the chalk.

5. In a device of the class described, the combination of a chalk-line, a reel, chalking mechanism, a line-shifter, and connections between the reel and line-shifter for operating the shifter.

6. In a device of the class described, the combination of a chalk-line, a spring-actuated reel, chalking mechanism, and a line-shifter actuated by the movement of the reel.

7. In a device of the class described, the combination of a chalk-line, a reel, chalking mechanism, a line-shifter, a lever engaging said shifter, and a cam operated by the movement of the reel to actuate the lever.

8. In a device of the class described, the combination of a chalk-line, a reel, a winding-spring, gearing between the reel and spring, a cam in one of the gears, chalking mechanism, a line-shifter, and a lever in engagement with the shifter and operated by the cam.

9. In a device of the class described, the combination of a chalk-line, a reel, a line-shifter and connections between the reel and line-shifter for operating the shifter.

10. In a device of the class described, the combination of a chalk-line, a casing, having an opening for the passage of the line, chalking mechanism, and cord-shifting mechanism having a slot which extends diagonally across the opening in the casing.

11. In a device of the class described, the combination of a chalk-line, a casing, a reel journaled therein, chalking mechanism, a line-shifter having a diagonally-extending slot through which the line passes, and connections between the line-shifter and the reel.

12. In a device of the class described, the combination of a chalk-line, a casing having a narrow opening for the passage of the line, a longitudinally-movable line-shifter, having a slot which extends diagonally across said opening, and is adapted by its movement across the opening to shift the line sidewise, and connections between the reel and shifter adapted to transfer the rotatory movement of the reel to the longitudinal movement of the shifter.

13. In a device of the class described, the combination of a chalk-line, a cylindrical casing, having an opening in its circular wall for the passage of the line, a line-shifter slidably mounted in the casing and having a slot extending diagonally across the opening, a reel, and connections between the line-shifter and reel.

14. In a device of the class described, the combination of a casing, reeling mechanism, a chalk-line, a brake for the reeling mechanism, a chalk-magazine, a chalk-stick, a spring-pressed follower for the chalk-stick, a line-shifter and suitable connections between the reeling mechanism and the line-shifter for operating the shifter.

15. In a device of the class described, the combination of a chalk-line, a reel, a line-shifting mechanism, and a chalk-stick having corrugated side faces.

16. A chalk-stick for devices of the class described having irregular side faces.

17. A chalk-stick for devices of the class described, segmental in form and having corrugated sides.

In witness whereof I have signed the above application for Letters Patent, at Chicago, in the county of Cook and State of Illinois, this 31st day of May, A D. 1906.

SJONNE S. FIELD.

Witnesses:
CHAS. O. SHERVEY,
WM. P. BOND.